United States Patent
Larsen

(10) Patent No.: US 7,126,323 B1
(45) Date of Patent: Oct. 24, 2006

(54) SYSTEMS AND METHODS FOR SYNCHRONOUS DETECTION OF SIGNALS

(75) Inventor: James Wagner Larsen, Suwanee, GA (US)

(73) Assignee: Admiralty Corporation, Atlanta, GA (US)

( * ) Notice: Subject to any disclaimer, the term of this patent is extended or adjusted under 35 U.S.C. 154(b) by 241 days.

(21) Appl. No.: 10/899,391

(22) Filed: Jul. 26, 2004

Related U.S. Application Data

(60) Provisional application No. 60/490,315, filed on Jul. 25, 2003.

(51) Int. Cl.
  *G01R 31/00* (2006.01)
  *G01R 19/00* (2006.01)
  *H03D 9/00* (2006.01)

(52) U.S. Cl. .................................. 324/76.77; 324/118

(58) Field of Classification Search ............ 324/76.77, 324/91, 118
  See application file for complete search history.

(56) References Cited

U.S. PATENT DOCUMENTS

| | | | |
|---|---|---|---|
| 3,686,564 A | 8/1972 | Mallick, Jr. et al. |
| 3,826,873 A | 7/1974 | Pflaum |
| 4,017,858 A | 4/1977 | Kuipers |
| 4,072,942 A | 2/1978 | Alongi |
| 4,486,713 A | 12/1984 | Gifford |
| 4,507,612 A | 3/1985 | Payne |
| 4,628,265 A | 12/1986 | Johnson et al. |
| 4,706,031 A | 11/1987 | Michiguchi et al. |
| 4,795,995 A | 1/1989 | Eccleston et al. |
| 4,868,504 A | 9/1989 | Johnson |
| 4,942,360 A | 7/1990 | Candy |
| 5,119,028 A | 6/1992 | Mooney et al. |
| 5,334,981 A | 8/1994 | Smith et al. |
| 5,557,206 A | 9/1996 | Won |
| 5,576,627 A | 11/1996 | McEwan |
| 5,642,050 A | 6/1997 | Shoemaker |
| 5,654,938 A | 8/1997 | Tang |
| 5,680,048 A | 10/1997 | Wollny |
| 5,781,436 A | 7/1998 | Forgang et al. |
| 5,786,696 A | 7/1998 | Weaver et al. |
| 5,955,884 A | 9/1999 | Payton et al. |
| 5,963,035 A | 10/1999 | Won |
| 6,204,667 B1 | 3/2001 | Won |
| 6,211,807 B1 | 4/2001 | Wilkison |
| 6,362,737 B1 | 3/2002 | Rodgers et al. |
| 6,534,985 B1 | 3/2003 | Holladay et al. |
| 6,541,966 B1 | 4/2003 | Keene |
| 6,724,191 B1 | 4/2004 | Larsen |
| 6,822,570 B1 | 11/2004 | Dimmer et al. |
| 2004/0017197 A1 | 1/2004 | Chen et al. |

OTHER PUBLICATIONS

Czipott, et al., 'Use of Superconductive Gradiometer in an Ultrasensitive Electromagnetic Metal Detector,' Mar. 1989, *IEEE Transactions on Magnetics*, vol. 25, pp. 1204-1207.
Bakhvalov, et al., 'Usage of Millimeter Waves in On-Board Radar for Detection of Objects on Small Depth in Ground,' *IEEE* 2000, pp. 432-434.
Chaturvedi, et al., 'Electromagnetic Imaging of Underground Targets Using Constrained Optimization,' 1995, *IEEE Transactions on GeoScience and Remote Sensing*, vol. 33, No. 3, pp. 551-561.

*Primary Examiner*—Bot LeDynh
(74) *Attorney, Agent, or Firm*—Kilpatrick Stockton LLP

(57) ABSTRACT

Systems and processes for synchronous demodulation of signals in detection contexts in order to improve frequency, magnitude and/or phase response over pulsed signal methods. According to a preferred embodiment, a return signal is demodulated for the time corresponding to when its corresponding transmitting signal has been discontinued or has fallen below a certain level. Multiple transmission frequencies, transmitters, and or sensors, among other things, may be used.

22 Claims, 11 Drawing Sheets

SYSTEMS AND METHODS FOR SYNCHRONOUS DETECTION OF SIGNALS

CROSS-REFERENCE TO RELATED APPLICATION

This application claims the benefit of U.S. Provisional Application No. 60/490,315 filed on Jul. 25, 2003, the contents of which are incorporated herein by reference.

BACKGROUND

This invention relates generally to demodulation of signals in detection systems.

One of the major problems in active transmit-receive detection systems is that the sensors that are supposed to pick up the response of the return signal from an object or secondary source, respond to the direct signal from the transmitter. This is a problem for several reasons. In most systems the transmitter signal is much larger than the return signal. In some systems this ratio can be over one million to one. Furthermore, in most systems the receive sensors are located physically closer to the transmitter than to the object that gives the return. Due to these factors, the desired sensor signal (the signal due to the return) is masked by the much larger sensor response to the direct signal. System designers spend great efforts to reduce the direct pickup by the sensors. In many cases the limiting sensitivity of a system is set by the system's ability to reduce the direct pickup of the sensors. This is especially true in continuous mode systems (systems that continuously transmit a signal).

To avoid this problem, systems were developed that transmitted relatively short pulses. The sensors were then set up to look only at the returns that came after the transmitter had stopped producing the pulse. FIG. 1. shows a typical transmitted pulse signal and its associated return signal. FIG. 2. shows the portion of the return signal that is recorded and analyzed by the pulsed system. In this manner the systems could transmit a relatively higher power pulse, albeit for a short period of time, that would not interfere with the return signal on the sensors. Since the pulse transmit times are relatively short the total transmitted energy is small. In these types of systems the elimination of the direct transmit signal at the sensor is related to the time it takes to turn off the transmitter and the waiting time between the pulse end and the time the sensor starts responding to the return signal. The nature of the laws of physics means that no real system can stop transmitting a signal instantaneously. This means that the system must wait until the direct signal at the sensor falls below a given level before it can use the sensor for detecting the return. These factors along with the response of the object to the transmitted signal govern the system's responsivity to the object.

SUMMARY AND BRIEF DESCRIPTION

Systems and processes according to various aspects and embodiments of the invention where developed to address at least some of these issues, among others.

DETAILED DESCRIPTION

Figure 1:
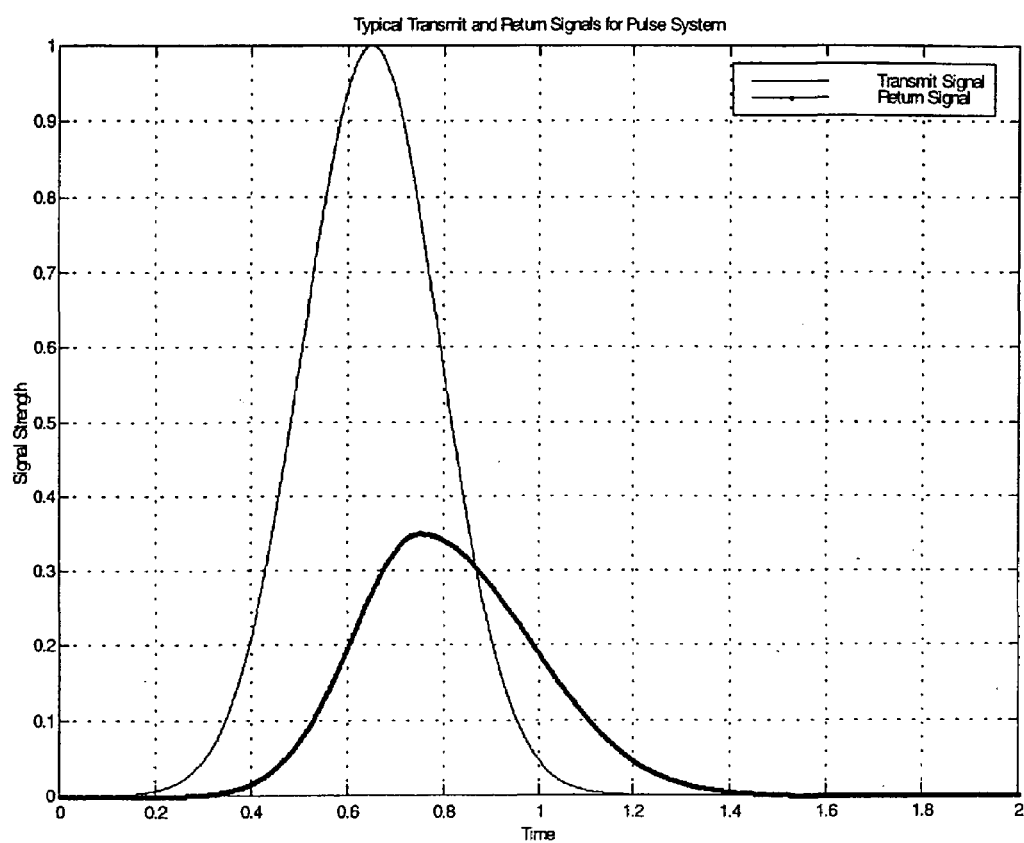
FIG. 1 is a plot which shows transmit and return signals for a conventional system.
Figure 2:
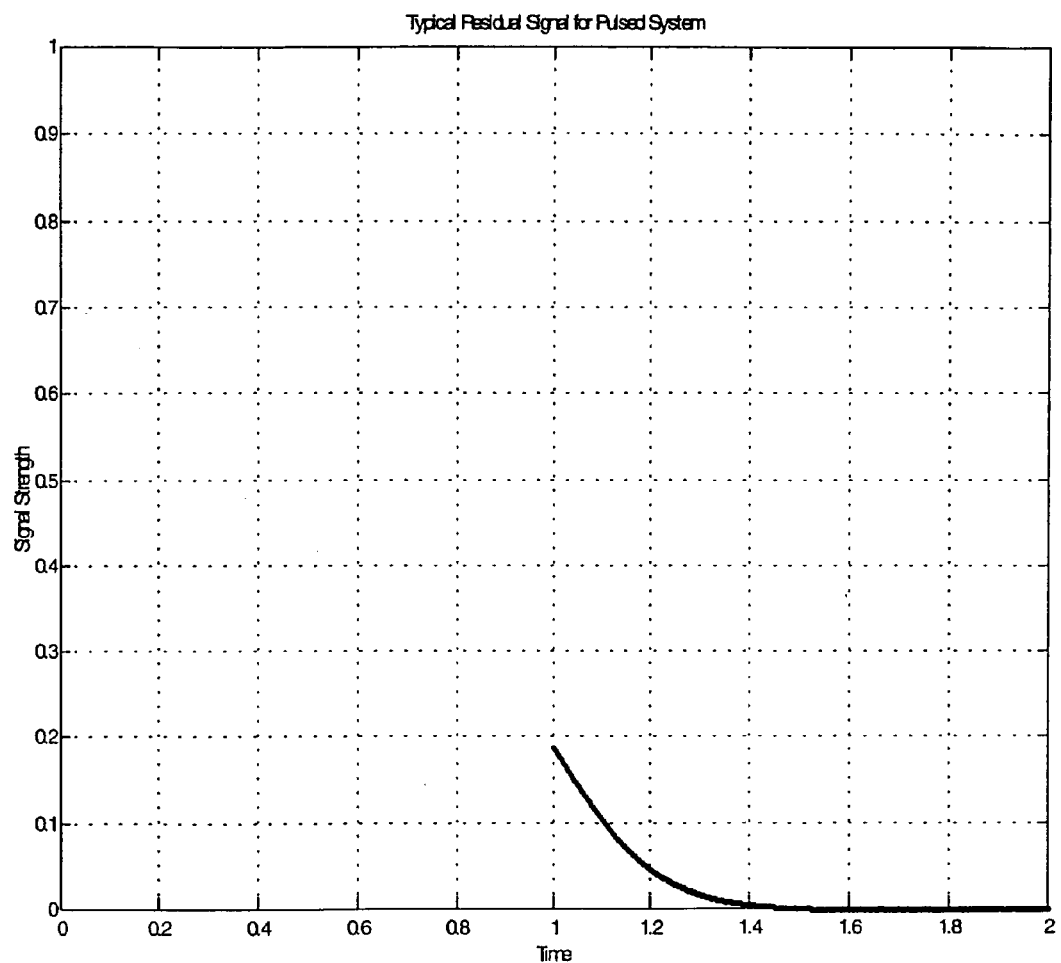
FIG. 2 is a plot which shows a portion of a return signal for the system of FIG. 1.

Any object will exhibit two types of responses to a signal. The first is the "direct" response that occurs effectively instantly to the signal. The direct portion of the return signal can be seen in FIG. 1. The second is the residual response" that is present after the signal has been removed. This secondary response generally decays with time. FIGS. 1 and 2 show the residual response decaying with time. In most situations this decay is very rapid. The decay time as well as the time of flight of the signal from the transmitter to the object and back to the sensor determine the allowable transmit pulse length time and pulse turn off time. In addition the desired spatial resolution between two or more objects will determine the allowable pulse length. In many situations the pulse length and turn off times must therefore be very short, making the total energy per pulse small. In spite of this the pulse technique gives better responsivity in many systems than the corresponding continuous mode systems.

Short pulses are by their nature broadband containing energy over many frequencies. These pulsed systems are therefore used for spectral analysis to obtain a spectral signature of an object. This signature allows differentiation between different objects. The method of obtaining the spectral response in most pulsed systems is to record the time response of the return for a given period after the pulse has been sent out. This period generally has a start time after the transmitter has turned off the pulse. The Fourier transform is taken over this sampled time period to produce the magnitude and phase of the residual frequency response of the object to the pulse. The accuracy of this response is limited by the system and background noises, the timing accuracy of the system and the strength of the return. In many systems using this method, such as metal detectors and eddy current detectors, the object is in the near field of the transmitter; therefore, only the residual is measured. This residual decays rapidly. Often in these cases the signal is very low and the response must be averaged over several pulses to get a usable signal. In these cases the repeatability of the system affects the accuracy.

The low energy of the pulses coupled with timing errors in recording the responses and the inherent repeatability problems of producing short pulses makes the frequency response obtained in this manner generally poorer than that which can be obtained in the continuous mode. In addition if there is a resonance in the objects response to the transmitted signal, it takes several cycles of signal at the resonant frequency to build up energy in the object. A short pulse cannot accomplish this.

Figure 3:
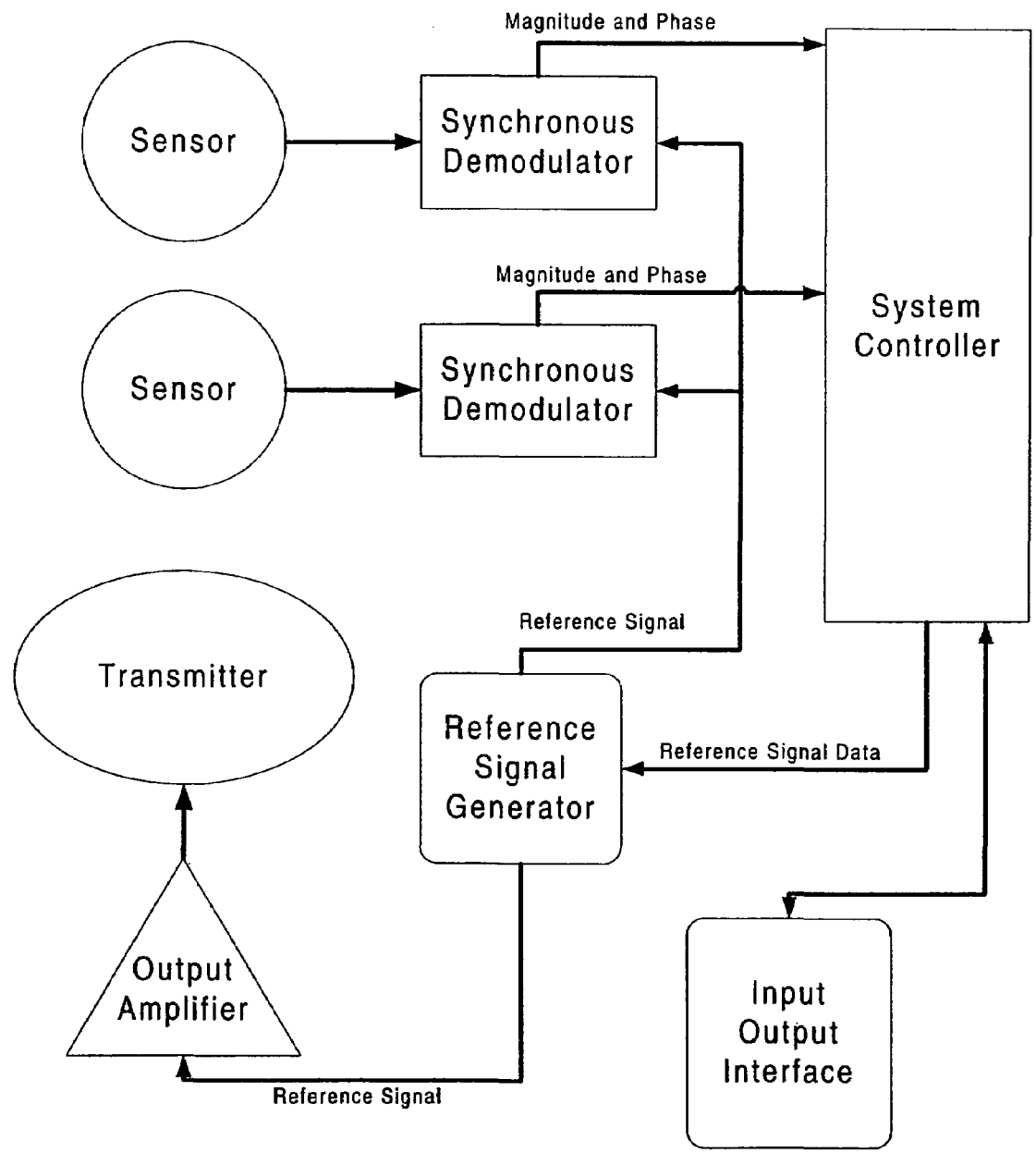
FIG. 3 is a plot which shows components of a preferred embodiment of a system which can be employed to carry out processes according to aspects of the invention.
Figure 4:
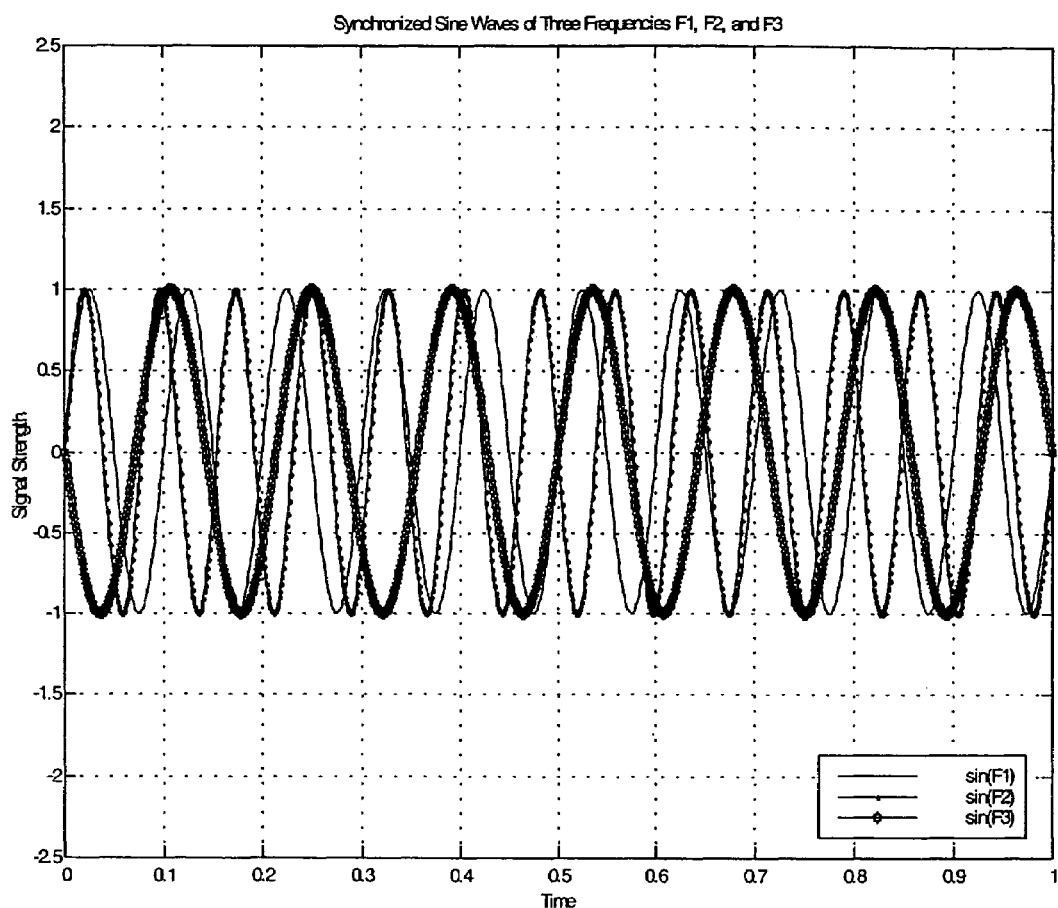
FIG. 4 is a plot which shows a multiple signals, each featuring a different frequency.
Figure 5:
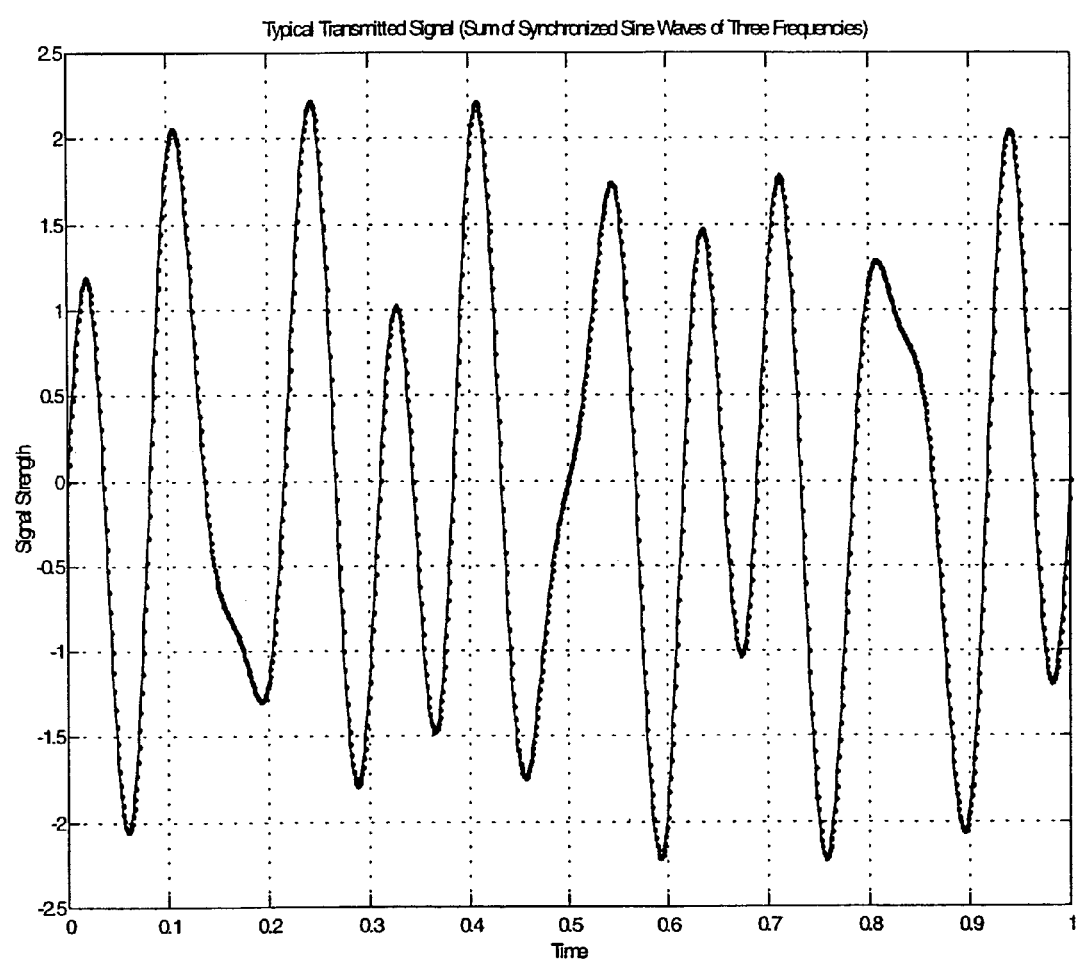
FIG. 5 is a plot which shows a waveform corresponding to the sum of the signals of FIG. 4.

If one were to synchronously generate, transmit, receive, and synchronously demodulate a continuous single-frequency or multi-frequency signal, the frequency response of the object would be measured at the transmitted frequencies. FIG. 3 shows a typical embodiment of such a system. The system controller sends the reference signal characteristic data to the reference signal generator. The reference signal generator uses this data to generate a reference signal that it then passes to the output amplifier to drive the transmitter. The reference signal generator also generates the reference signals that it passes to the synchronous demodulators. The demodulators then" use this signal to demodulate the sensor signals in order to calculate the magnitude and phases of the sensor signals with respect to the magnitude and phases of the frequencies transmitted by the transmitter. These magnitudes and phases are passed back to the system controller for further analysis, classification, and storage, and to be passed to other parts of the system or the user via the input/output interface. FIG. 4 shows a set of three frequencies that might be combined into the continuous transmitter output signal. FIG. 5 shows the output signal that might be generated from a linear combination of the signals depicted in FIG. 4.

Because the number of frequencies is finite the transmitted energy at a particular frequency could be much higher than in a pulsed system. In addition the repeatability of these types of systems is much better than that generally achievable with pulsed systems. If there is an object resonance, the continuous transmitted signal would contain several cycles and the signal energy could be built up in the object at the resonant frequency. This system would have the responsivity and drawbacks of any continuous mode system.

Figure 6:
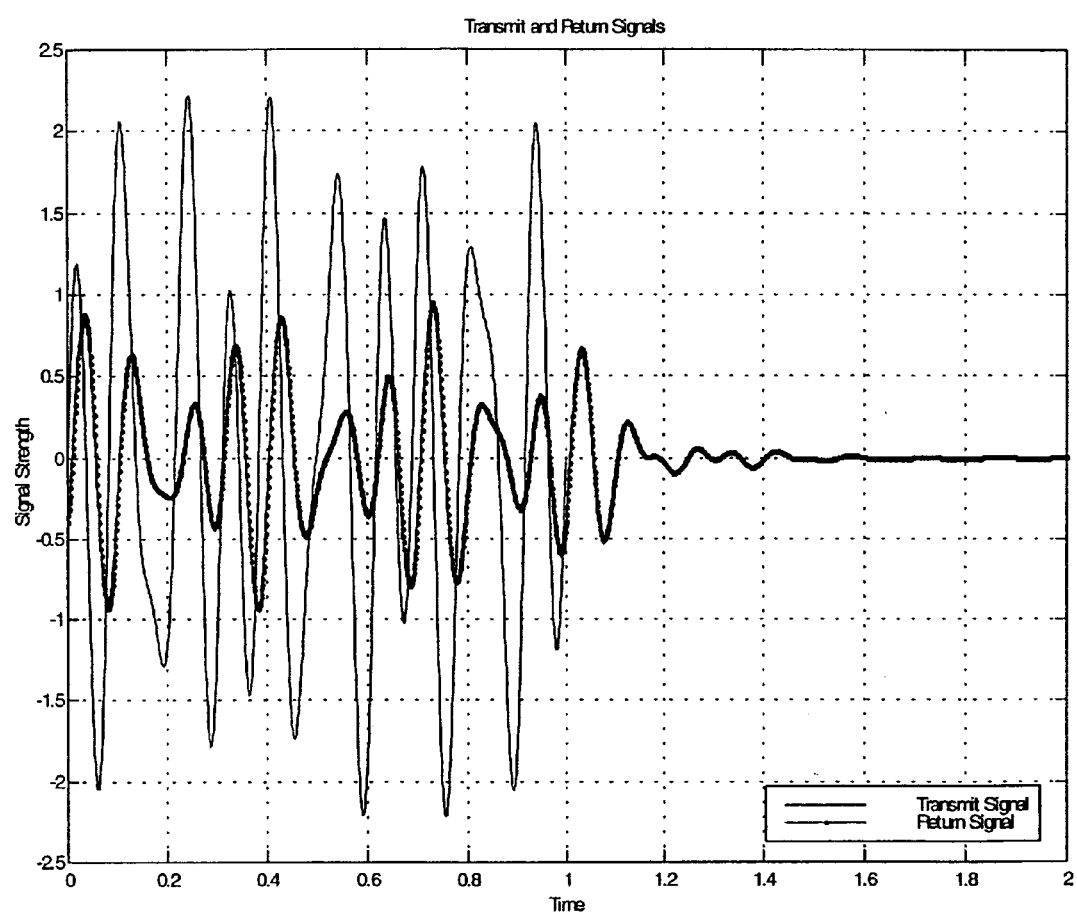
FIG. 6 is a plot which shows a waveform corresponding to a return signal from the waveform of FIG. 5, before and after the transmitted signal has been discontinued.
Figure 7:
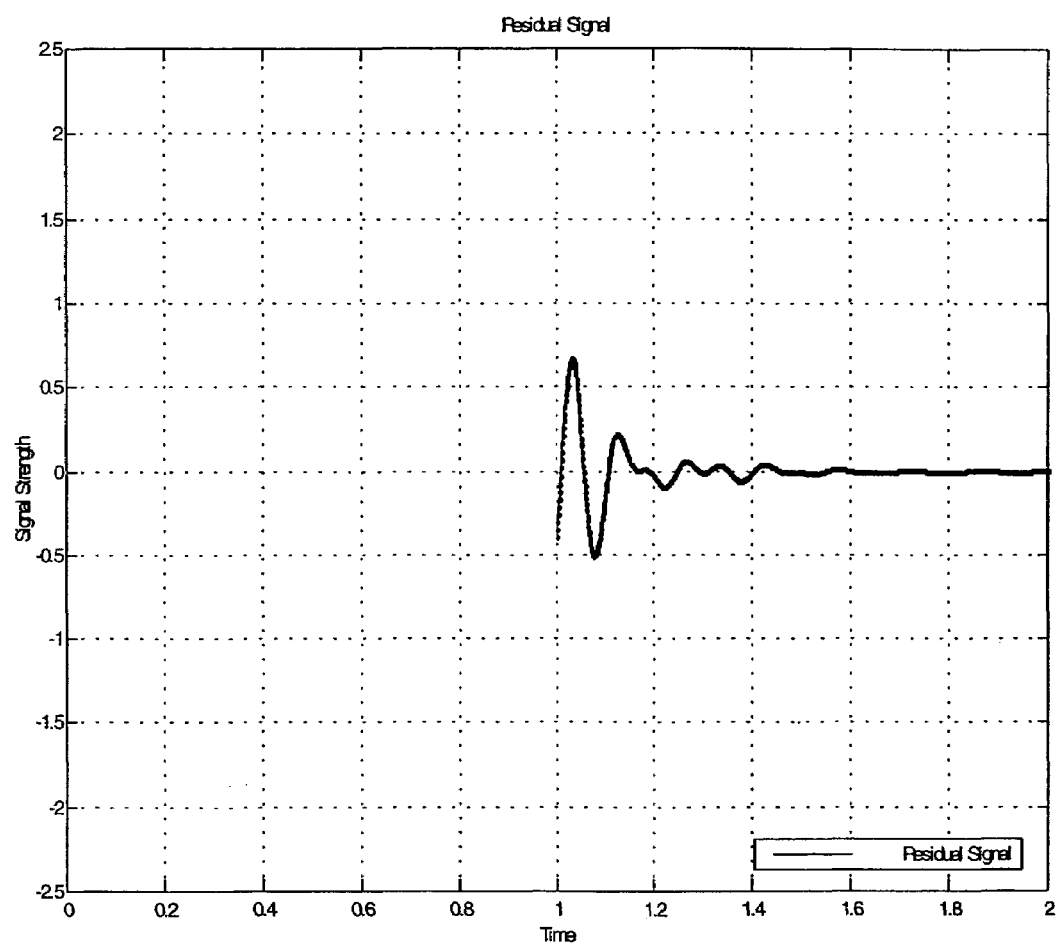
FIG. 7 is a plot which shows the waveform of FIG. 6 for the period of time after the transmitted signal has been discontinued.

If, however, after some period of time the transmitter was shut down but the synchronous demodulation of the sensor signal continued in the same timing reference as if the transmitter were still transmitting, then the system would be synchronously recording the residual response of the object after the signal has been removed, just as in the pulsed mode. The difference is that the recording is still synchronous with the particular phase timing of the previously transmitted signal. This allows for a very accurate measurement of the magnitude and phase response of the object's residual signal. FIG. 6 shows the continuous signal of FIG. 5. being stopped at time equal 1.0. The figure also shows the return signal during the time while the continuous signal is being transmitted and after the continuous signal has been stopped. FIG. 7 shows the residual part of the multifrequency signal's return which is synchronously demodulated. With this type of system the energy at the frequencies of interest could be much higher than that of the pulsed system since energy need only be put into these frequencies and not into a wide band. Also if there were resonances present they would have had enough time during the continuous transmission time to build up energy and would, therefore have a stronger residual response than they would if energized by only a short pulse. In addition the ability to rapidly turn off a single frequency in a known and repeatable manner is much more precise than that for a broadband pulse.

Figure 8:
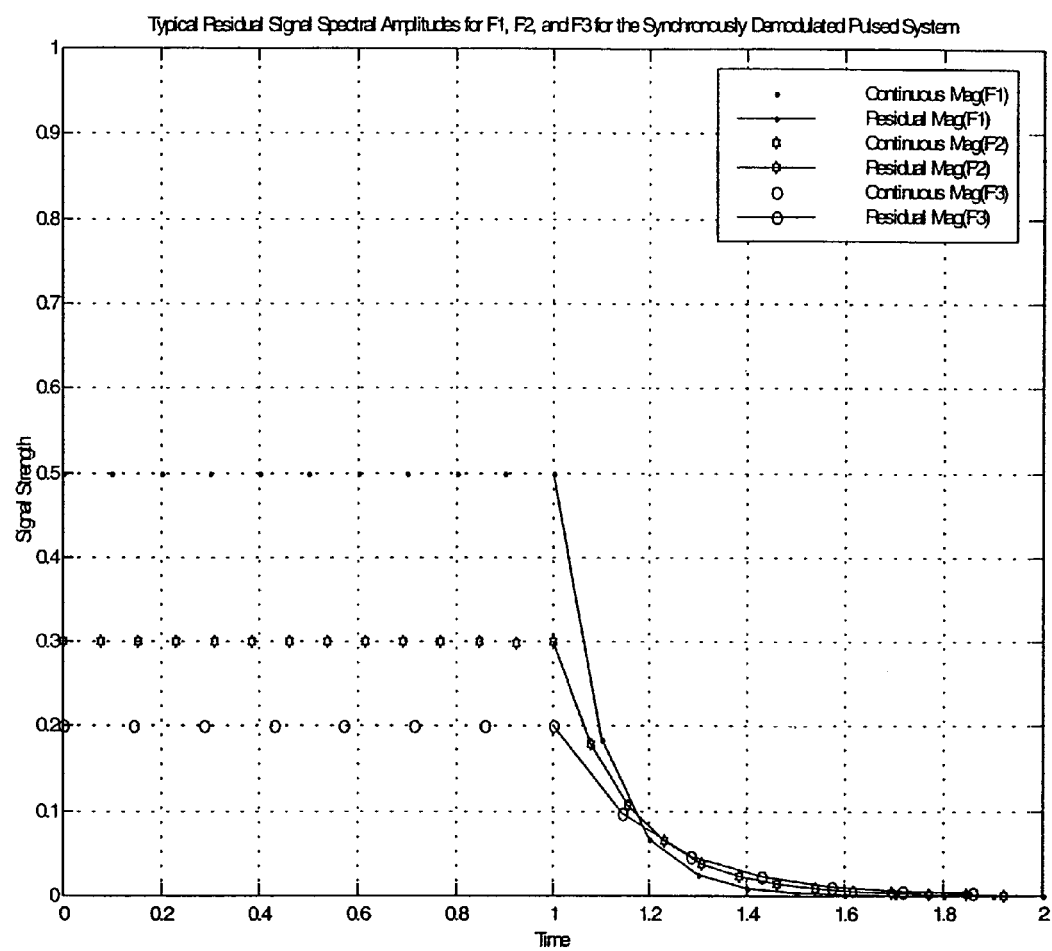
FIG. 8 is a plot which shows demodulation output from the waveforms shown in FIGS. 6 and 7.
Figure 9:
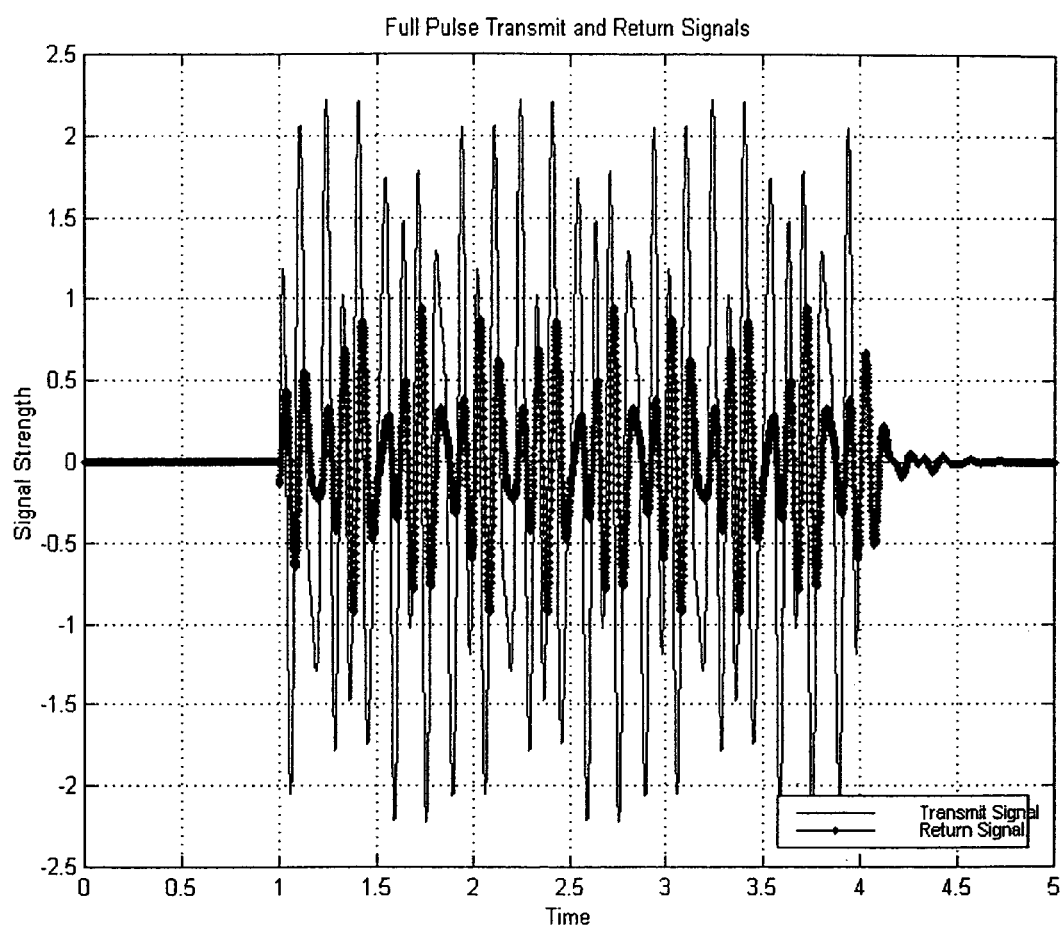
FIG. 9 is a plot which shows return before, during and after transmission of a pulse according to one embodiment of the invention.
Figure 10:
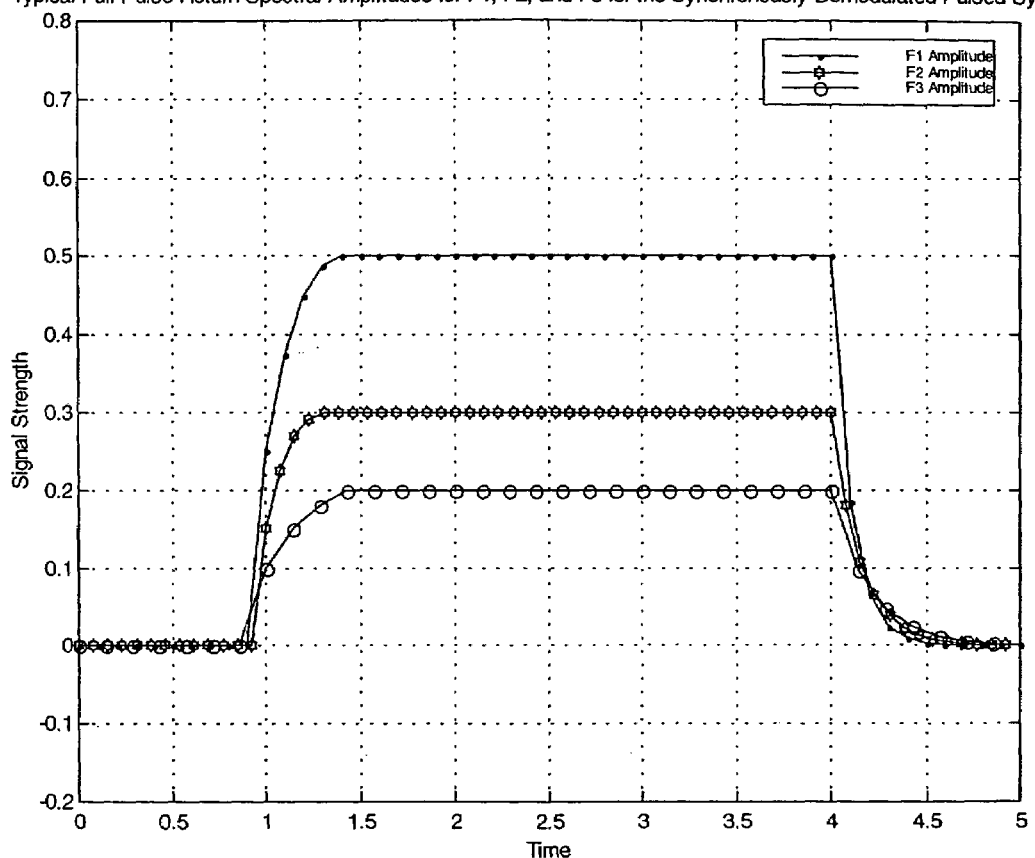
FIG. 10 is a demodulation output from the waveform shown in FIG. 9.
Figure 11:
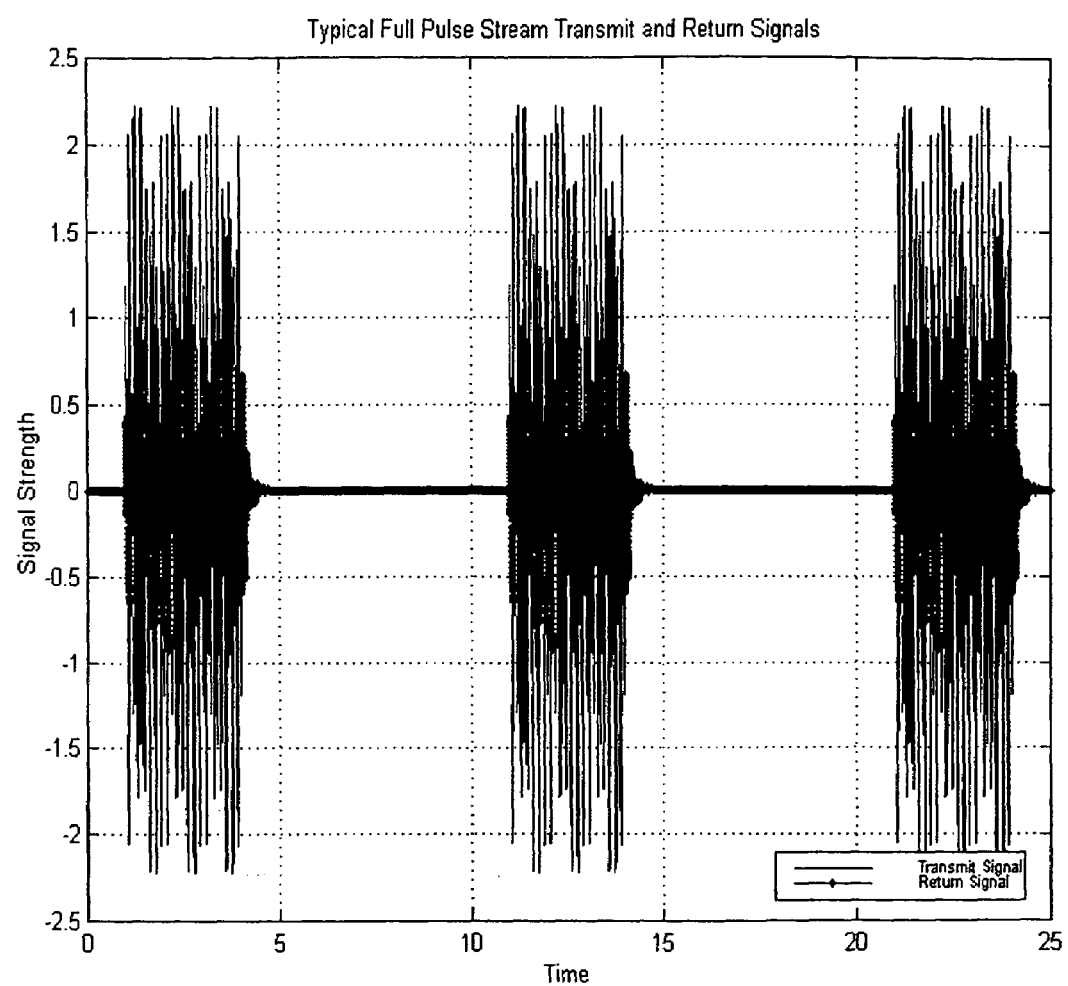
FIG. 11 is a plot which shows a plurality of transmit and return signal pulses according to one embodiment of the invention.

All of the techniques for producing and synchronously demodulating singlefrequency and multi-frequency signals could be applied to this method to achieve a much higher accuracy frequency, magnitude and phase, response than in the pulsed signal method. Due to the type of demodulation schemes that can be employed, the temporal demodulation resolution will enable the estimation of the relative decay times for the broadcast frequencies. FIG. 8 shows the typical demodulation output that might be obtained for the return depicted in FIGS. 6 and 7. This technique will also allow direct comparison of the continuous response and the residual response for the return from an object. A similar analysis could be performed during the starting end of the continuous portion of the transmission. This end would show any energy build up in the material due to the transmitted frequencies and the effects this has on the return: FIG. 9 shows a typical full pulse and its return. FIG. 10 shows the typical demodulation output that might be obtained from the pulse return depicted in FIG. 9. The figure shows the turn on response (with energy build up), the continuous response, and the residual response. The pulses would be retransmitted after a period of time. The system would supply a continuous stream of pulses to be synchronously demodulated. FIG. 11 shows a section of a typical pulse stream.

The pulses shown in FIG. 11 are all identical; however, there are scenarios in which one would use a stream of different pulses depending on the nature of the physical system. In addition the pulse frequency content would be varied to enhance the detectability of objects in certain background conditions or to enhance the detectability of certain objects. For instance in the case of electromagnetic sensors penetrating soils, lower frequencies will have better penetration in moist or conductive soils. The frequency content could be changed in real-time to accommodate better penetration as the soil properties change. When searching for objects with known characteristics in a particular region switching between frequencies in that region and frequencies outside that region would help discriminate between the desired object and other features.

What is claimed is:

1. A method for synchronous detection of a pulsed signal in a transmit-receive detection system comprising:
   transmitting at least one transmitted signal, said signal having a frequency, continuously for a period of time;
   receiving a return signal on at least one sensor, said return signal corresponding to said transmitted signal;
   synchronously demodulating said return signal to calculate the relative magnitudes and phases between said at least one return signal and said at least one transmitted signal;
   ceasing to transmit said transmitted signal;
   after ceasing to transmit said transmitted signal, continuing to demodulate said return signal whereby a timing relationship with said at least one transmitted signal is maintained.

2. The method of claim 1 wherein a plurality of transmitted signals are transmitted.

3. The method of claim 2 wherein each of said transmitted signals features a different frequency.

4. The method of claim 1 wherein said transmitting and said receiving are performed using a plurality of transmitters and sensors.

5. The method of claim 1 wherein said transmitting is performed using different transmitters to transmit different frequencies or sets of frequencies.

6. The method of claim 5 wherein at least two of said different frequencies are of a different physical nature.

7. The method of claim 6 wherein one of said different frequencies is sound, and another of said frequencies is an electric field.

8. The method of claim 1 wherein said receiving is performed using different sensors to receive different frequencies or sets of frequencies.

9. The method of claim 8 wherein at least two of said different frequencies are of a different physical nature.

10. The method of claim 9 wherein one of said different frequencies is sound, and another of said frequencies is an electric field.

11. The method of claim 1 wherein the synchronous demodulation ceases and is restarted maintaining the timing relationship with said at least one transmitted signal for at least one period during transmission of the continuous signal and for a time after the transmitter signal has stopped.

12. The method of claim 1 wherein said synchronous demodulation is performed using an analog phase detector.

13. The method of claim 1 wherein said synchronous demodulation is performed using an analog phase detector.

14. The method of claim 1 wherein said synchronous demodulation is performed by a computer using software.

15. The method of claim 1 wherein said at least one transmitted signal comprises a pulse stream and at least one of said pulses includes changed frequency content in order to enhance detectability under specific conditions.

16. The method of claim 15 wherein frequency content of pulses in the pulse stream is changed in real-time for the purpose of enhancing penetration in changing background materials.

17. The method of claim 15 wherein frequency content of pulses in the pulse stream is changed in real-time for the purpose of enhancing penetration in changing material type or composition in eddy current material analysis.

18. The method of claim 15 wherein frequency content of pulses in the pulse stream are changed in real-time for the purpose of enhancing detectability of certain objects based on the return signal.

19. The method of claim 18 wherein if the return signal indicates presence of a nonmagnetic but highly resistive material, changing the frequency content of said transmitted signal to determine thickness of the material based on skin depth estimations.

20. The method of claim 19 wherein said changing is performed in order to differentiate between thick resistive materials and thin conductive materials such as foils, that would otherwise exhibit similar frequency responses over certain frequencies.

21. A method of synchronous detection of a pulsed signal in a transmit-receive detection system comprising:
    transmitting, continuously for a period of time, a plurality of transmitted signals, at least some of said signals including a frequency different from a frequency in other of said signals;
    receiving a plurality of return signals on at least one sensor, said return signals corresponding to said transmitted signals;
    synchronously demodulating said return signals to calculate the relative magnitudes and phases between said return signals and said transmitted signals;
    ceasing to transmit at least some of said transmitted signals;
    after ceasing to transmit said at least some of said transmitted signals, continuing to demodulate said return signals whereby a timing relationship with said transmitted signals is maintained.

22. A method of synchronous detection of a pulsed signal in a transmit-receive detection system comprising:
    transmitting, continuously for a period of time, a plurality of transmitted signals, at least some of said signals including a frequency different from a frequency in other of said signals, said transmitting performed using a plurality of transmitters;
    receiving a plurality of return signals on a plurality of sensors, said return signals corresponding to said transmitted signals;
    synchronously demodulating said return signals to calculate the relative magnitudes and phases between said return signals and said transmitted signals;
    ceasing to transmit at least some of said transmitted signals;
    after ceasing to transmit said at least some of said transmitted signals, continuing to demodulate said return signals whereby a timing relationship with said transmitted signals is maintained.

* * * * *